Figure 1:
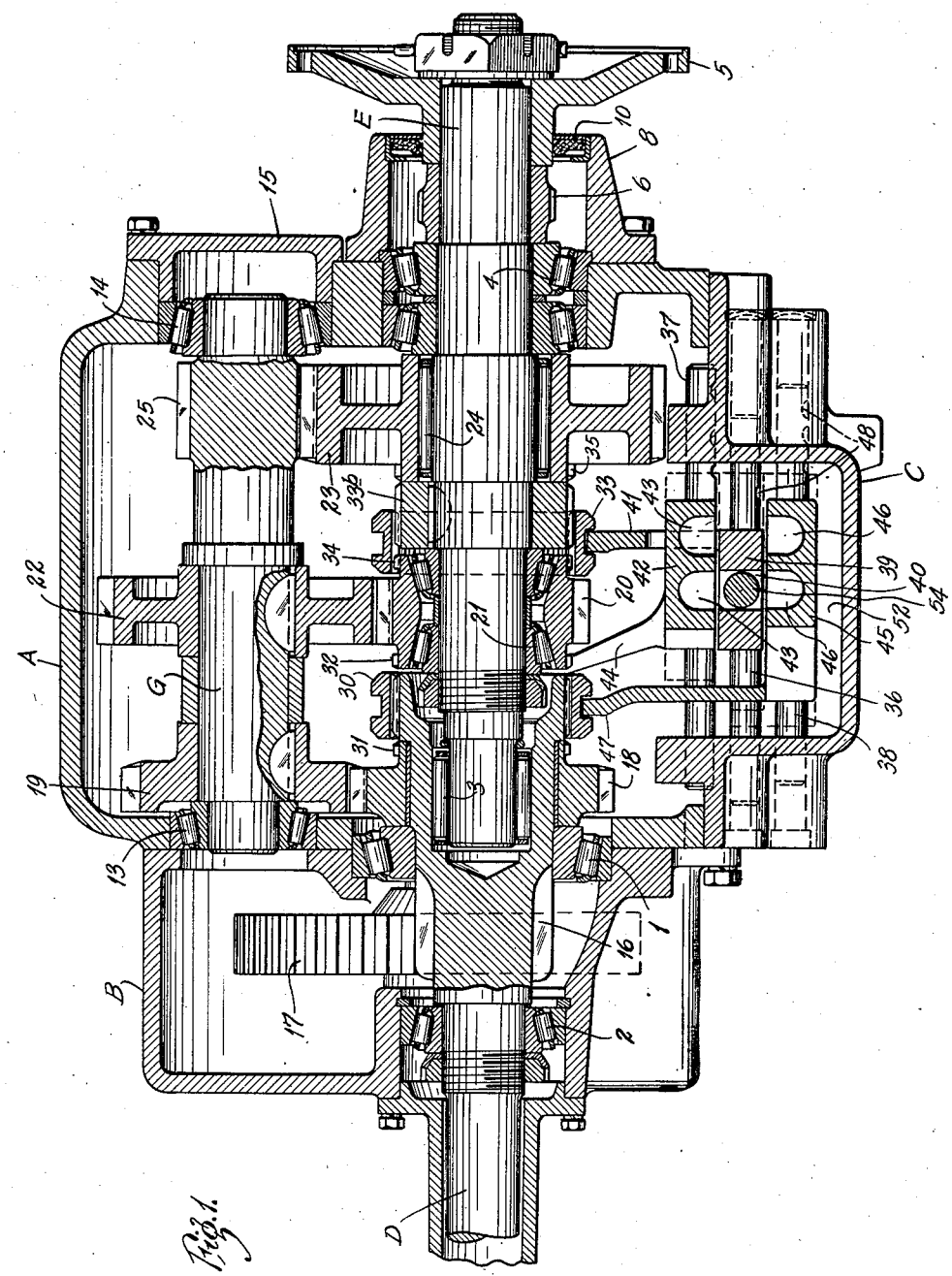

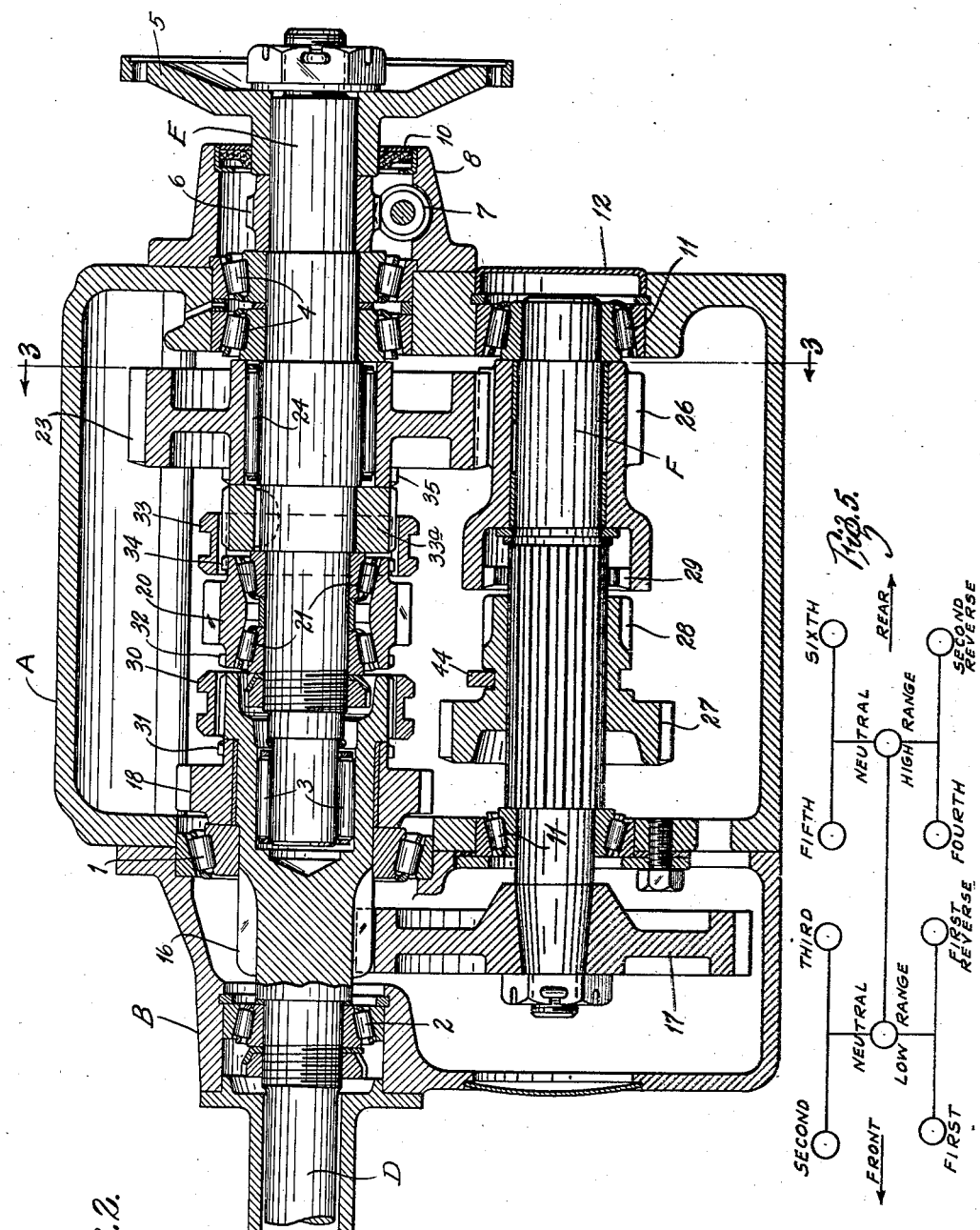

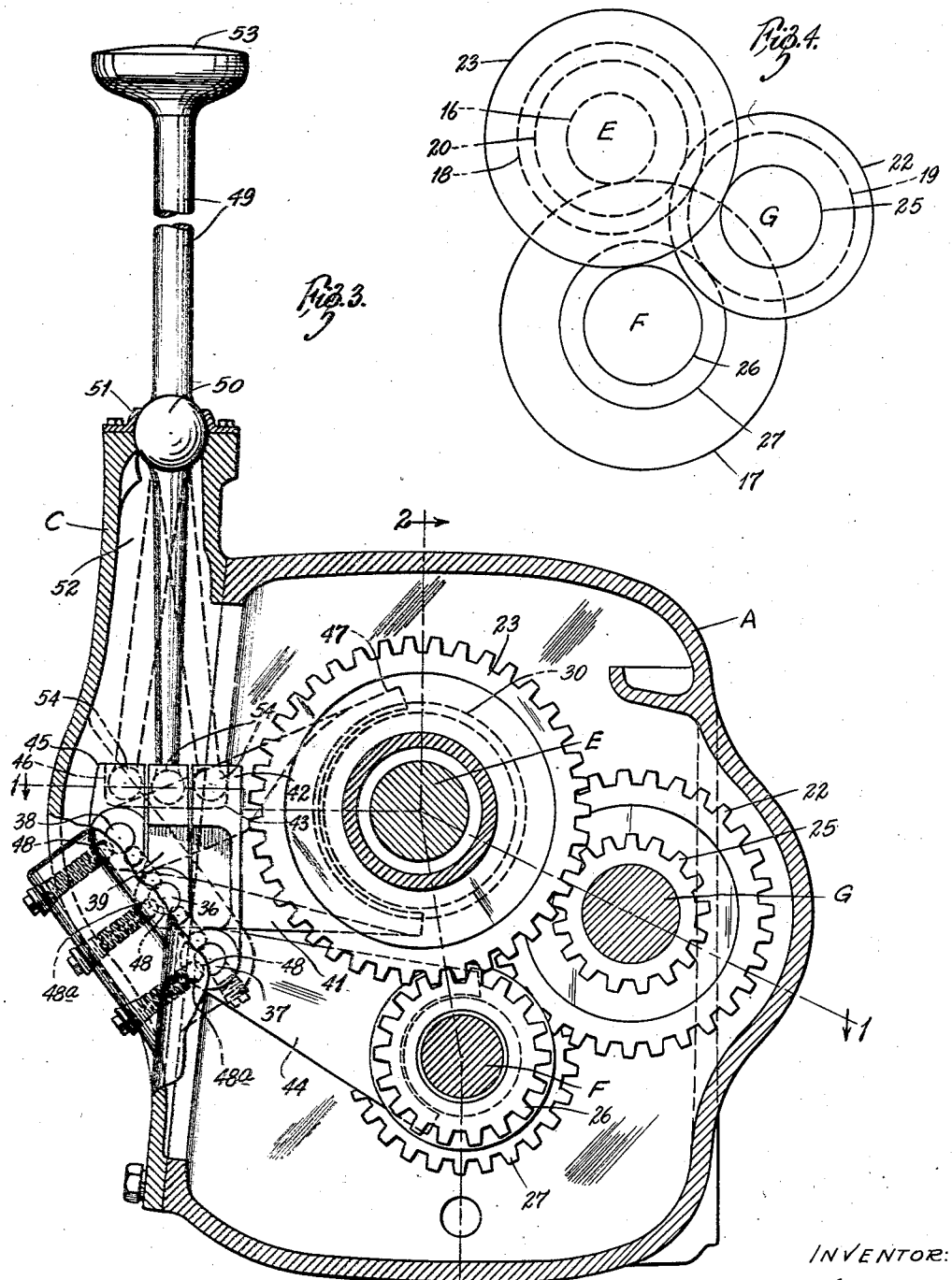

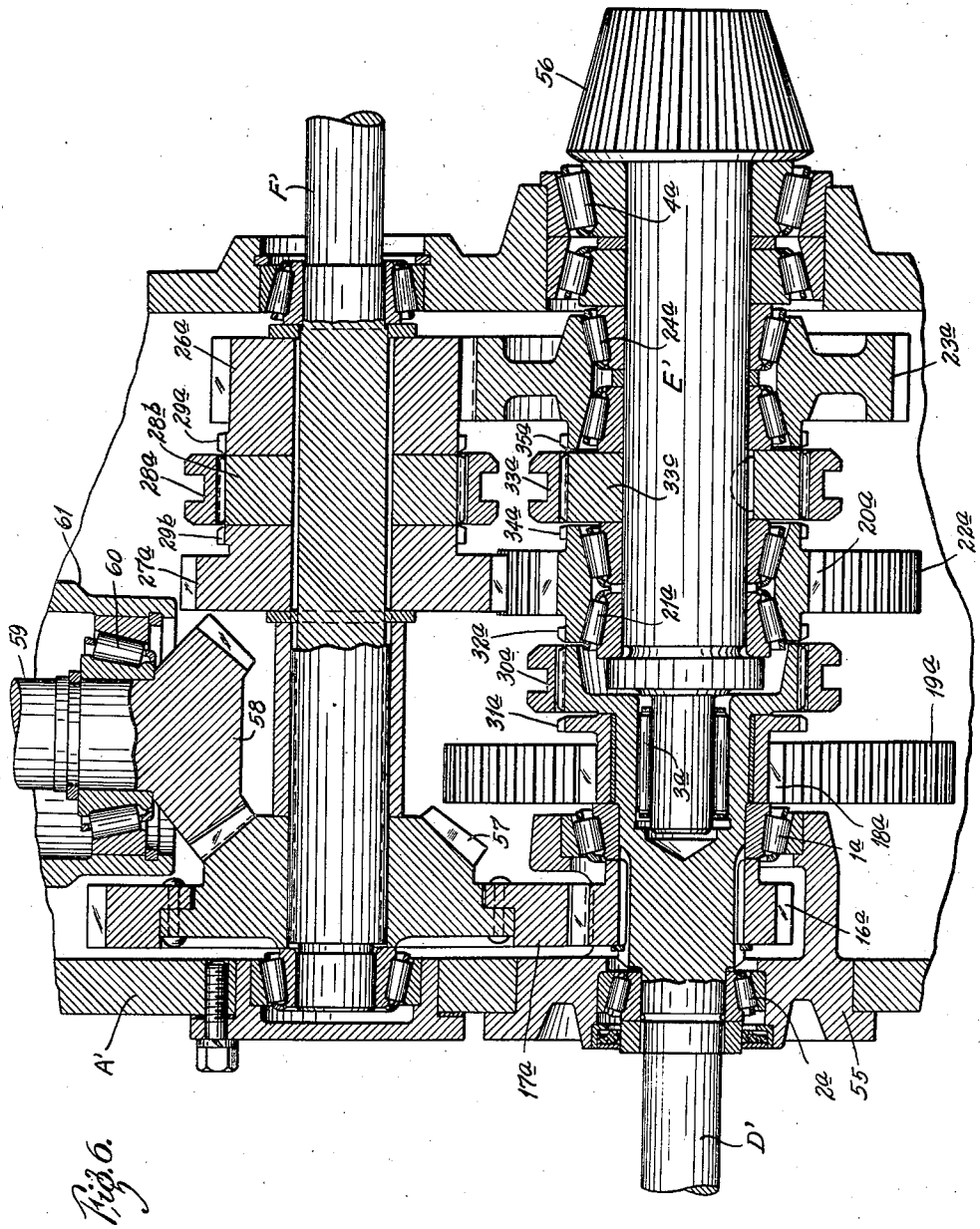

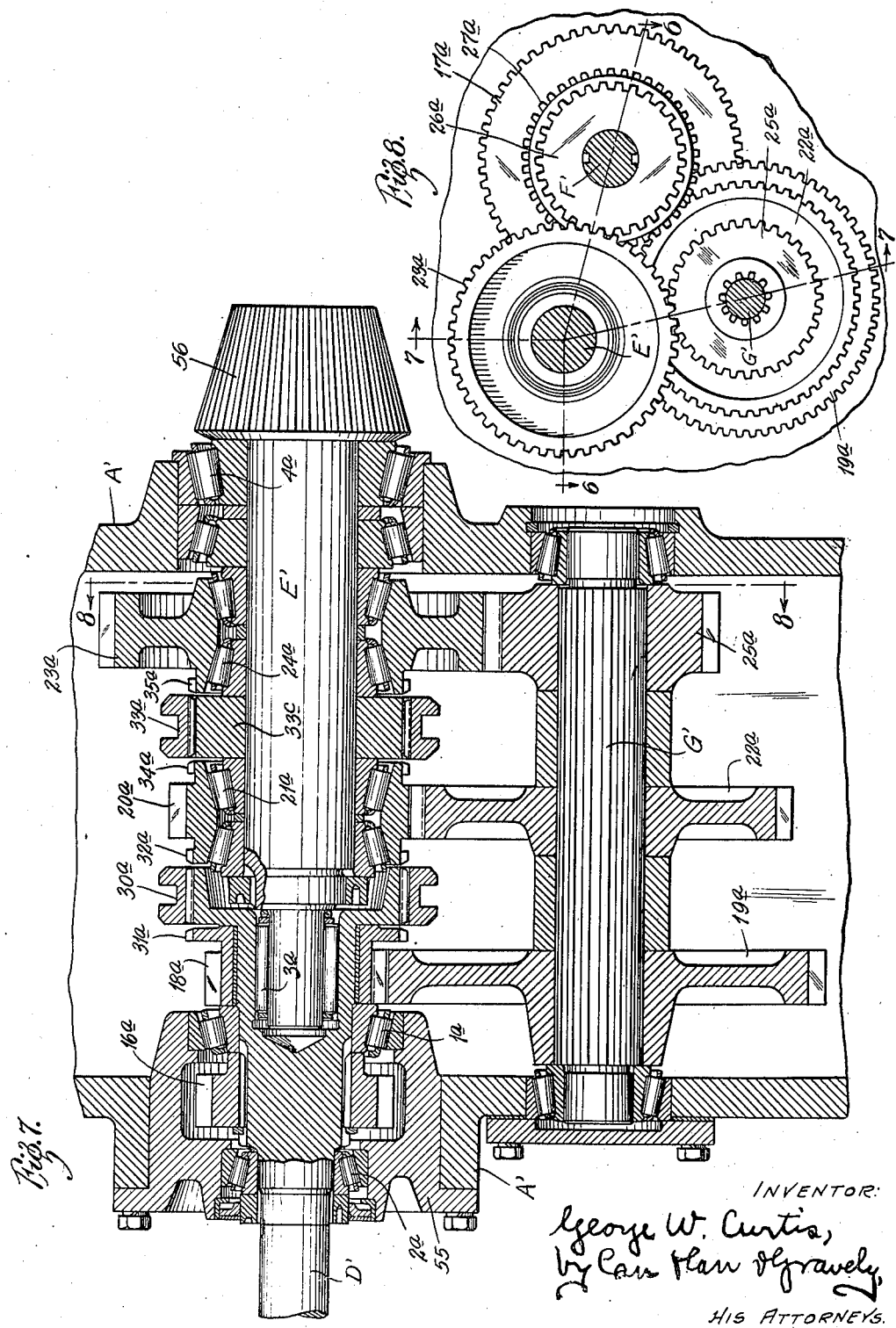

Patented Apr. 13, 1943

2,316,503

UNITED STATES PATENT OFFICE 2,316,503

CHANGE SPEED TRANSMISSION GEARING

George W. Curtis, Milwaukee, Wis., assignor to The Timken Roller Bearing Company, Canton, Ohio, a corporation of Ohio Application October 13, 1941, Serial No. 414,707

11 Claims. (Cl. 74—331)

This invention relates to change speed transmission gearing. It has for its principal objects a simple, economical and compact change speed transmission gearing that will provide six forward and two reverse speed changes and a wide range between low and high speeds and a substantially uniform increase in speed between each gear change, that will enable all of the speed changes to be made with a single shifter lever having a minimum overall travel; that will provide for the ready attachment to and removal of the shifting mechanism from the gear housing with a cover therefor as a complete preassembled unit; that will provide a power take-off without the use of extra transmission gears; and that may be readily adapted for both automotive trucks and tractors. The invention consists in the change speed transmission gearing and in the construction, combinations and arrangements of parts hereinafter described and claimed.

In the accompanying drawings, which form part of this specification and wherein like symbols refer to like parts wherever they occur, Fig. 1 is a longitudinal section through a change speed transmission mechanism embodying my invention, the section being taken on the line 1—1 in Fig. 3, Fig. 2 is a vertical longitudinal section on the line 2—2 in Fig. 3, Fig. 3 is a vertical transverse section on the line 3—3 in Fig. 2, Fig. 4 is a diagrammatic view similar to Fig. 3, showing the relation of the gears on one shaft to those on the other shafts, Fig. 5 is a diagram showing the double-H pattern for the shifter lever, Fig. 6 is a longitudinal section through a modified form of change speed gearing, the section being taken on the line 6—6 in Fig. 8, Fig. 7 is a vertical longitudinal section on the line 7—7 in Fig. 8; and Fig. 8 is a vertical cross section on the line 8—8 in Fig. 7.

The change speed transmission mechanism shown in Figs. 1 to 4, inclusive, of the accompanying drawings is intended for use with automotive trucks. Said transmission mechanism comprises a main gear casing or housing A provides with a removable front section B and a removable side cover C, horizontally disposed axially alined power input and output shafts D and E, respectively, and countershafts F and G, respectively, disposed parallel with said input and output shafts. The power input shaft D extends into the casing A through the removable front section B thereof and is journaled in a suitable bearing 1 mounted in registering openings in the abutting front and rear walls of said casing and front section and a suitable bearing 2 mounted in an opening in the front wall of said front section. The input shaft D has a suitable pocket bearing 3 adapted to receive and rotatably support the adjacent, forward end of the output shaft E. The output shaft E extends rearwardly through an opening in the rear end wall of the gear casing A and is journaled in a suitable bearing 4 mounted in said opening. The rear end of the output shaft E is located exteriorly of the casing A and is provided with a suitable final drive flange 5. As shown in the drawings, the output shaft E is provided between the bearing and the hub of the drive flange with a worm gear 6 that meshes with a worm 7 for driving a speedometer (not shown). The worm gear is journaled in an outstanding tubular extension 8 fixed to the rear wall of the casing A in axial alinement with the opening for bearing 4; and the annular space between the hub of the drive flange 5 and said opening is closed by a suitable oil seal 10.

The countershaft F located in the casing A below the axially alined input and output shafts is journaled in suitable bearings 11 mounted in openings provided therefor in the front and rear walls, respectively, of the gear casing A, the opening in the rear casing being closed by a suitable closure cap 12. The countershaft F extends forwardly into the removable front section B of the gear casing. The countershaft G located at one side of the axially alined input and output shafts D and E has its ends journaled in suitable bearings 13 and 14 mounted in openings provided therefor in the front and rear walls, respectively, of the gear casing A, the rear opening being closed by a suitable closure member 15.

The portion of the power input shaft D located in the removable front section B of the gear casing A has a gear 16 formed thereon that intermeshes continuously with a gear 17 that is located inside of said front section and is fixed to the front end of the countershaft F. The power input shaft D has a second gear 18 rotatably mounted thereon inside of the gear casing A adjacent to the front wall thereof, which gear intermeshes continuously with a gear 19 fixed to the countershaft G adjacent to said wall of said casing. The output shaft E has a gear 20 journaled thereon near the rear inner end of the input shaft D by means of the suitable bearing 21, which gear intermeshes continuously with a second gear 22 fixed to the countershaft G. The power output shaft also has a second gear 23 journaled thereon by means of a suitable bearing 24, which gear intermeshes continuously with a third gear 25 fixed to the countershaft G. The countershaft F has a second gear 26 rotatably mounted thereon adjacent to the rear wall of the casing A. A third gear 27 is splined on the countershaft F between the gear 26 journaled thereon and the front wall of the casing A. The gear 27 is adapted to be intermeshed with the gear 19 on the countershaft G. The gear 27 on the countershaft F has external clutch teeth 28 adapted to be engaged with internal clutch teeth 29 on the gear 26 journaled on said shaft to cause the gear 26 to rotate with said shaft.

The inner end of the power input shaft D has a clutch sleeve 30 splined thereon adapted to engage clutch elements 31 on the gear 18 journaled on said shaft and thus lock said gear thereto for rotation therewith. The clutch sleeve 30 is also adapted to engage clutch elements 32 on the gear 20 journaled on the output shaft E, thus locking said gear to the power input shaft D for rotation therewith. A second clutch sleeve 33 is splined on a collar 33b fixed to the output shaft E between the gears 20 and 23 thereon. The clutch sleeve 33 is adapted to engage clutch elements 34 on the gear 20 and thus lock the latter to the output shaft E. The clutch sleeve 33 is also adapted to engage clutch elements 35 on the gear 23 journaled on the power output shaft and thus lock said gear to said shaft.

By the arrangement described, first or low speed is obtained by engaging the clutch sleeve 33 on the output shaft E with the gear 23 journaled thereon and by engaging clutch element 28 of the gear 27 splined on the countershaft F with the gear 26 journaled thereon, whereby the drive is transmitted from the power input shaft D to said power output shaft through the gears 16, 17, 26 and 23. For driving in second speed, the clutch sleeve 30 is engaged with the gear 20 journaled on the output shaft E and the clutch sleeve 33 is engaged with the gear 23 journaled on said shaft, whereby the drive is transmitted from the input shaft D to said output shaft through the gears 20, 22, 25 and 23. Third speed is obtained by engaging the clutch sleeve 30 on the input shaft D with the gear 18 journaled thereon and by engaging clutch 33 on the output shaft E with the gear 23 journaled thereon, whereby the drive is transmitted from said input to said output shaft through the gears 18, 19, 25 and 23. Fourth speed is obtained by engaging the clutch sleeve 33 on the output shaft with gear 20 journaled thereon and by clutching the gear 27 splined on the countershaft F to the gear 26 journaled thereon, whereby the drive is transmitted from the input to said output shaft through the gears 16, 17, 26, 23, 25, 22 and 20. Fifth or direct speed is obtained by engaging the clutch sleeve 30 on the input shaft D with the gear 20 journaled on the output shaft and by engaging the clutch sleeve 33 on said output shaft with said gear. Sixth speed is obtained by engaging the clutch sleeve 30 on the input shaft D with the gear 18 journaled thereon and by engaging the clutch sleeve 33 on the output shaft E with the gear 20 journaled thereon, whereby the drive is transmitted from said input shaft to said output shaft through the gears 18, 19, 22 and 20.

Two reverse speeds may also be obtained. Low reverse speed is obtained by engaging the clutch sleeve 33 on output shaft E with the gear 23 journaled thereon and by sliding the gear 27 on the countershaft F into mesh with the gear 19 on the countershaft G, whereby the drive is transmitted from the input shaft D to said output shaft through the gears 16, 17, 27, 19, 25 and 23. High reverse speed is obtained by engaging the clutch sleeve 33 on the output shaft E with the gear 20 journaled thereon and by meshing the gear 27 splined on the countershaft F with the gear 19 fixed to the countershaft G, whereby the drive is transmitted from the input to the output shaft through the gears 16, 17, 27, 19, 22 and 20.

The mechanism for shifting the clutch sleeves 30 and 33 and the combined gear and clutch member 27 is supported in the side cover C of the gear casing A for attachment to and removal from said casing with said cover as a unit. Said mechanism preferably comprises horizontally disposed spaced parallel shifter rails 36, 37 and 38 supported in the cover C for independent endwise sliding movement parallel with the shaft axes. The intermediate shifter rail 36 has an upstanding arm 39, with a cross notch 40 in the top thereof, and a laterally extending fork 41 cooperating with the clutch sleeve 33; the shifter rail 37 has an upstanding arm 42, with longitudinally spaced recesses or pockets 43 in the top thereof that open toward the arm 39, and a fork 44 that cooperates with combined clutch and gear 28; and the shifter rail 38, an upstanding arm 45, with longitudinally spaced recesses or pockets 46 in the top thereof that open toward the arm 39, and a fork 47 that engages the clutch sleeve 30. The upstanding arms of the three shifter rails terminate in the same horizontal plane and the bottoms of the notches or pockets in said ends of said arms also are disposed in the same horizontal plane. In accordance with common practice, each of the shifter rails is provided with longitudinally spaced notches 48 adapted in the different positions of the rails to cooperate with spring-pressed balls 48a that are mounted in suitable recesses provided therefor in the cover B and are adapted to releasably hold said rails in the desired position of longitudinal adjustment.

The shifter forks are selectively actuated by means of a single upright shifter lever 49 having intermediate the ends thereof a ball-shaped portion 50 journaled in a socket 51 provided therefor at the upper end of an opening 52 that leads downwardly from the top of the cover C to accommodate the lower arm of the shifter lever and the arms of the shifter rails and opens laterally into the casing A to accommodate the forks of said shifter rails. The shifter lever 49 terminates at its upper end in an operating knob or handle 53 and at its lower end in an enlargement 54 adapted to be selectively engaged with the pockets or recesses 40, 43 and 46 in the arms of the shifter rails 36, 37 and 38, respectively.

As shown in the double-H shifter lever diagram of Fig. 5, two speed ranges are provided, the shifter lever 49 seating in the recess in the arm of the shifter rail 36 in high range neutral position and being movable crosswise into engagement with the pockets in the arms of the shifter rails 37 or 38 to obtain the high speed ranges (fourth, fifth and sixth speed) and high reverse speed. For low range neutral position, the shifter lever is engaged with the notch 40 in the arm of the shifter rail 36 and this rail shifted rearwardly to bring the notch 40 opposite the rear pockets in the arms of the shifter rails 31 and 38, in which position said lever may be shifted crosswise into engagement with either of said pockets to obtain any one of the low speeds (first, second and third speeds) or low reverse speed. The shifter lever in moving between low neutral to high neutral shifts the shifter rail 36 which controls the clutch sleeve 33 and locks the gear 20 or the gear 23 to the output shaft E. When the gear 20 is locked to the output shaft, the high range speeds are obtained, and when the gear 23 is locked to said shaft, the low range speeds are obtained.

The hereinbefore described change speed gear mechanism has several important advantages, it provides six forward speeds and two reverse speeds with a minimum number of gears; and all of these speeds are obtained by means of a single shifter lever having a minimum length of fore-and-aft movement. The mechanism provides a wide range between low and high speeds, and the speeds are in two ranges with a substantially uniform increase in speed between each gear change. The entire shifter gear mechanism is mounted in the cover which closes the opening in one side of the gear casing whereby said mechanism and said cover may be quickly and easily attached to and removed from the casing as a unit, and the large side opening closed by said cover facilitates the work of assembling the gears in the transmission case. A power take-off may be readily provided without the use of extra transmission gears by substituting for the removable front section B of the gear casing A a larger front section (not shown) containing a suitable power take-off mechanism adapted for engagement with the large gear 17 located outside of said casing.

The change speed transmission gearing shown in Figs. 6, 7 and 8 is particularly adapted for use with tractors. This tractor transmission mechanism comprises a gear casing A', axially alined power input and output shafts D' and E' respectively, a countershaft F' located at one side of said input and output shafts and a countershaft G' located therebelow. The input shaft D' extends into the casing A' through an opening provided therefor in the front wall thereof and is journaled in axially spaced bearings 1a and 2a in a bearing housing 55 removably mounted in said opening. The output shaft E' has its forward end journaled in a pocket bearing 3a provided therefor in the adjacent end of the input shaft D' and extends rearwardly through an opening provided therefor in the rear end wall of the gear casing A' and is journaled in bearings 4a provided therefor in said opening. The rear end of the output shaft E' terminates exteriorly of the gear casing A' and has a beveled drive gear 56 thereon for driving the differential mechanism (not shown) of the tractor. The input shaft E' has a gear 16a fixed thereon between the bearings 1a and 2a therefor, which gear intermeshes continuously with a gear 17a fixed to the countershaft F'. The hub portion of the gear 17a has a bevel gear 57 thereon that is in continuous mesh with a bevel gear 58 rigid with a power take-off shaft 59 journaled in a suitable bearing 60 mounted in a bearing housing 61 mounted in an opening provided therefor in the side wall of the casing A'. The input shaft D' also has a gear 18a journaled thereon which intermeshes continuously with a gear 19a fixed to the countershaft G'. Output shaft E' has a gear 20a rotatably supported thereon by means of a suitable bearing 21a, which gear intermeshes continuously with a gear 22a fixed to the countershaft G'. Said output shaft also has a second gear 23a journaled thereon by means of a suitable bearing 24a, which gear intermeshes continuously with a gear 25a fixed to the countershaft G' and a gear 26a journaled on the countershaft F'. The countershaft F' also has a gear 27a journaled thereon that intermeshes continuously with the gear 22a on the countershaft G'.

The inner end of the input shaft D' has a clutch sleeve 30a splined thereon adapted to be engaged with a clutch element 31a of the gear 18a journaled on said shaft, or with a clutch element 32a of the gear 20a journaled on the power output shaft E'. The power output shaft E' has a clutch sleeve 33a splined on a collar 33c fixed to said shaft, said clutch sleeve being adapted to be engaged with the clutch elements 34a on the gear 20a journaled on said output shaft or with clutch elements 35a of the gear 23a journaled on said shaft. The gears 26a and 27a journaled on the countershaft F' are adapted to be selectively locked thereto for rotation therewith by means of a clutch sleeve 28a that is splined on a sleeve 28b fixed to said shaft between said gears. The clutch sleeve 28a is adapted to be shifted in one direction into engagement with clutch elements 29a on the gear 26a and in the other direction into engagement with clutch elements 29b on the gear 27a.

The operation of the modified change speed transmission gearing shown in Figs. 6, 7 and 8 is as follows: for driving in first or low speed, the clutch sleeve 30a on the input shaft D' is engaged with the gear 18a thereon and the clutch sleeve 33a on the power output shaft E' is engaged with the gear 23a thereon, whereby the drive is transmitted from the input shaft D' to said output shaft through the gears 18a, 19a, 25a and 23a. Second speed is obtained by engaging the clutch sleeve 28a on the countershaft F' with the gear 26a journaled thereon and the clutch sleeve 33a on the output shaft E' is engaged with the gear 23a journaled thereon, the drive being through the gears 16a, 17a, 26a and 23a. Third speed is obtained by engaging the clutch sleeve 30a on the input shaft D' with the gear 20a journaled on the output shaft E' and by engaging the clutch sleeve 33a on said output shaft with the gear 23a journaled thereon, the drive being transmitted through the gears 20a, 22a, 25a and 23a. Fourth speed is obtained by engaging the clutch sleeve 33a on the output shaft E' with the gear 20a journaled thereon, and by engaging the clutch sleeve 30a on the input shaft D' with the gear 18a journaled thereon, the drive being transmitted through the gears 18a, 19a, 22a and 20a. Fifth speed is obtained by engaging the clutch sleeve 33a on the output shaft E' with the gear 20a journaled thereon and by engaging the clutch sleeve 28a on countershaft F' with gear 26a journaled thereon, the drive being transmitted through the gears 16a, 17a, 26a, 23a, 25a, 22a and 20a. Sixth speed is obtained by engaging the clutch sleeve 30a on the input shaft with the gear 20a journaled on output shaft E' and by engaging the clutch sleeve 33a on the output shaft with the gear 20a journaled thereon, the drive being transmitted direct from said input to said output shaft.

The modified transmission mechanism also provides two reverse speeds. Low reverse speed is obtained by engaging the clutch 28a on the countershaft F' with the gear 27a journaled thereon and by engaging the clutch sleeve 33a on the output shaft with the gear 23a journaled thereon, the drive being transmitted through the gears 16a, 17a, 21a, 22a, 25a and 23a. High reverse speed is obtained by engaging the clutch 28a on the countershaft F' with the gear 27a journaled thereon and by engaging the clutch sleeve 33a on the output shaft with the gear 20a journaled thereon, the drive being transmitted through the gears 16a, 17a, 21a, 22a and 20a. The clutches 28a, 30a and 33a may be operated by means of the gear shift mechanism and the double-H shift pattern hereinbefore described.

In both forms of change speed gearing hereinbefore described, six forward and two reverse speeds are obtained with only ten gears due to the use of the gears 20, 20a and 23, 23a as two or three-purpose gears, which multi-purpose gears not only reduce to a minimum the number of gears required for each transmission but also enable the overall length of the transmission to be materially reduced. Each of the gears 20, 20a serves as a driving member when clutched to the input shaft and as a driven member when clutched to the output shaft, while each of the gears 23, 23a, when clutched to the output shaft, serves as a final drive gear in three forward speeds and in one reverse speed and as an idler in another forward speed.

Obviously, the hereinbefore described change speed mechanism admits of considerable modification without departing from the invention. Therefore, I do not wish to be limited to the precise arrangements shown and described.

What I claim is:

1. A change speed transmission mechanism comprising axially alined power input and output shafts and two countershafts alongside thereof, a gear rigid with said input shaft, a gear journaled on said input shaft, first and second gears journaled on said output shaft, a first gear rigid with one of said countershafts and intermeshing continuously with the gear journaled on said input shaft, a second gear rigid with said countershaft and intermeshing continuously with said first gear on said output shaft, a third gear rigid with said countershaft and intermeshing continuously with said second gear on said output shaft, a first gear rigid with the other countershaft and intermeshing continuously with the gear rigid with said input shaft, a second gear on said other countershaft and intermeshing continuously with said second gear journaled on said output shaft, a third gear mounted on said other countershaft and adapted to transmit motion from the latter to said first mentioned countershaft through one of said gears thereon, means for clutching to said input shaft either the gear journaled thereon or said first gear on said output shaft, and means for clutching to said output shaft either of said first and second gears thereon.

2. A change speed transmission mechanism comprising axially alined power input and output shafts and two countershafts alongside thereof, a gear rigid with said input shaft, a gear journaled on said input shaft, first and second gears journaled on said output shaft, a first gear rigid with one of said countershafts and intermeshing continuously with the gear journaled on said input shaft, a second gear rigid with said countershaft and intermeshing continuously with said first gear on said output shaft, a third gear rigid with said countershaft and intermeshing continuously with said second gear on said output shaft, a first gear rigid with the other countershaft and intermeshing continuously with the gear rigid with said input shaft, a second gear on said other countershaft and intermeshing continuously with said second gear journaled on said output shaft, a third gear mounted on said other countershaft and adapted to transmit motion from the latter to said first mentioned countershaft through one of said gears thereon, means for clutching to said input shaft either the gear journaled thereon or said first gear on said output shaft, means for clutching to said output shaft either of said first and second gears thereon, a main casing enclosing all of said gears except the gear rigid with said input shaft and said first gear on said other countershaft, and a casing section removably secured to said main casing and enclosing said two last mentioned gears and rotatably supporting said input shaft.

3. A change speed transmission mechanism comprising axially alined power input and output shafts and two countershafts alongside thereof, a gear rigid with said input shaft, a gear journaled on said input shaft, first and second gears journaled on said output shaft, a first gear rigid with one of said countershafts and intermeshing continuously with the gear journaled on said input shaft, a second gear rigid with said countershaft and intermeshing continuously with said first gear on said output shaft, a third gear rigid with said countershaft and intermeshing continuously with said second gear on said output shaft, a first gear rigid with the other countershaft and intermeshing continuously with the gear rigid with said input shaft, a second gear journaled on said other countershaft and intermeshing continuously with said second gear journaled on said output shaft, a third gear mounted on said other countershaft and adapted to transmit rotary motion from the latter to said first mentioned countershaft through one of said gears thereon, means for clutching to said other countershaft said second gear journaled thereon, means for clutching to said input shaft either the gear journaled thereon or said first gear on said output shaft, and a second means for clutching to said output shaft either of said first and second gears thereon.

4. A change speed transmission mechanism comprising axially alined power input and output shafts and two countershafts alongside thereof, a gear rigid with said input shaft, a gear journaled on said input shaft, first and second gears journaled on said output shaft, a first gear rigid with one of said countershafts and intermeshing continuously with the gear journaled on said input shaft, a second gear rigid with said countershaft and intermeshing continuously with said first gear on said output shaft, a third gear rigid with said countershaft and intermeshing continuously with said second gear on said output shaft, a first gear rigid with the other countershaft and intermeshing continuously with the gear rigid with said input shaft, a second gear on said other countershaft and intermeshing continuously with said second gear journaled on said output shaft, a third gear mounted on said other countershaft for axial sliding but non-rotary movement thereon, means for sliding said third gear on said other countershaft into mesh with one of said gears on said first mentioned countershaft or into clutching engagement with said second gear on said other countershaft, means for clutching to said input shaft either the gear journaled thereon or said first gear journaled on said output shaft, and means for clutching to said output shaft either of said first and second gears journaled thereon.

5. A change speed transmission mechanism comprising axially alined power input and output shafts and two countershafts alongside thereof, a gear rigid with said input shaft, a gear journaled on said input shaft, first and second gears journaled on said output shaft, a first gear rigid with one of said countershafts and intermeshing continuously with the gear journaled on said input shaft, a second gear rigid with said countershaft and intermeshing continuously with said first gear on said output shaft, a third gear rigid with said countershaft and intermeshing continuously with said second gear on said output shaft, a first gear rigid with the other countershaft and intermeshing continuously with the gear rigid with said input shaft, a second gear journaled on said other countershaft and intermeshing continuously with said second gear on said output shaft, a third gear mounted on said other countershaft for axial sliding but non-rotary movement thereon, means for sliding said third gear on said other countershaft into mesh with said first gear on said first mentioned countershaft or into clutching engagement with said second gear on said other countershaft, means for clutching to said other countershaft said second gear journaled thereon, means for clutching to said input shaft either the gear journaled thereon or said first gear journaled on said output shaft, and means for clutching to said output shaft either of said first and second gears journaled thereon.

6. A change speed transmission mechanism comprising axially alined power input and output shafts and two countershafts alongside thereof, a gear rigid with said input shaft, a gear journaled on said input shaft, first and second gears journaled on said output shaft, a first gear rigid with one of said countershafts and intermeshing continuously with the gear journaled on said input shaft, a second gear rigid with said countershaft and intermeshing continuously with said first gear on said output shaft, a third gear rigid with said countershaft and intermeshing continuously with said second gear on said output shaft, a first gear rigid with the other countershaft and intermeshing continuously with the gear rigid with said input shaft, a second gear journaled on said other countershaft and intermeshing continuously with said second gear on said output shaft, a third gear mounted on said other countershaft for axial sliding but non-rotary movement thereon, means for sliding said third gear on said other countershaft into mesh with said first gear on said first mentioned countershaft or into clutching engagement with said second gear on said other countershaft, means for clutching to the input shaft the gear journaled thereon or for clutching said input shaft to said first gear on said output shaft, and means for clutching to said output shaft either of said first and second gears thereon, a main casing enclosing all of said gears except the gear rigid with said input shaft and said first gear on said other countershaft, and a casing section removably secured to said main casing and enclosing said two last mentioned gears and rotatably supporting said input shaft.

7. A change speed transmission mechanism comprising axially alined power input and output shafts and two countershafts alongside thereof, a gear rigid with said input shaft, a gear journaled on said input shaft, first and second gears journaled on said output shaft, a first gear rigid with one of said countershafts and intermeshing continuously with the gear journaled on said input shaft, a second gear rigid with said countershaft and intermeshing continuously with said first gear on said output shaft, a third gear rigid with said countershaft and intermeshing continuously with said second gear on said output shaft, a first gear rigid with the other countershaft and intermeshing continously with the gear rigid with said input shaft, a second gear journaled on said other countershaft and intermeshing continuously with said second gear on said output shaft, a third gear mounted on said other countershaft for axial sliding but non-rotary movement thereon, means for sliding said third gear on said other countershaft into mesh with said first gear on said first mentioned countershaft or into clutching engagement with said second gear on said other countershaft, a sleeve slidably but non-rotatably mounted on said input shaft between the gear journaled thereon and said first gear on said output shaft for clutching to the input shaft the gear journaled thereon or for clutching said input shaft to said first gear on said output shaft, and a sleeve slidably but non-rotatably mounted on said output shaft between said first and second gear thereon for clutching to said output shaft either of said first and second gears thereon.

8. A change speed transmission mechanism comprising axially alined power input and output shafts and two countershafts alongside thereof, a gear rigid with said input shaft, a gear journaled on said input shaft, first and second gears journaled on said output shaft, a first gear rigid with one of said countershafts and intermeshing continuously with the gear journaled on said input shaft, a second gear rigid with said countershaft and intermeshing continuously with said first gear on said output shaft, a third gear rigid with said countershaft and intermeshing continuously with said second gear on said output shaft, a first gear rigid with said other countershaft and intermeshing continuously with the gear rigid with said input shaft, a second gear journaled on said other countershaft and intermeshing continuously with said second gear on said output shaft, a third gear journaled on said other countershaft and intermeshing continuously with said second gear on said first mentioned countershaft, means for clutching to said input shaft either the gear journaled thereon or the first gear on said output shaft, means for clutching to said output shaft either of said first and second gears thereon, and means for clutching to said other countershaft either the second or third gear thereon.

9. A change speed transmission mechanism comprising axially alined power input and output shafts and two countershafts alongside thereof, a gear rigid with said input shaft, a gear journaled on said input shaft, first and second gears journaled on said output shaft, a first gear rigid with one of said countershafts and intermeshing continuously with the gear journaled on said input shaft, a second gear rigid with said countershaft and intermeshing continuously with said first gear on said output shaft, a third gear rigid with said countershaft and intermeshing continuously with said second gear on said output shaft, a first gear rigid with said other countershaft and intermeshing continuously with the gear rigid with said input shaft, a second gear journaled on said other countershaft and intermeshing continuously with said second gear on said output shaft, a third gear journaled on said other countershaft and intermeshing continuously with said second gear on said first mentioned countershaft, means for clutching to said input shaft either the gear journaled thereon or the first gear on said output shaft, means for clutching to said output shaft either of said first and second gears thereon, means for clutching to said other countershaft either the second or third gear thereon, and a power take-off shaft adjacent to said other countershaft and operatively connected thereto to be driven thereby.

10. A change speed transmission mechanism comprising axially alined power input and output shafts and two countershafts alongside thereof, a gear rigid with said input shaft, a gear journaled on said input shaft, first and second gears journaled on said output shaft, a first gear rigid with one of said countershafts and intermeshing continuously with the gear journaled on said input shaft, a second gear rigid with said countershaft and intermeshing continuously with said first gear on said output shaft, a third gear rigid with said countershaft and intermeshing continuously with said second gear on said output shaft, a first gear rigid with said other countershaft and intermeshing continuously with the gear rigid with said input shaft, a second gear journaled on said other countershaft and intermeshing continuously with said second gear on said output shaft, a third gear journaled on said other countershaft and intermeshing continuously with said second gear on said first mentioned countershaft, a sleeve slidably but non-rotatably mounted on said input shaft between the gear journaled thereon and said first gear on said output shaft for selectively clutching to said input shaft either the gear journaled thereon or the first gear on said output shaft, a sleeve slidably but non-rotatably mounted on said output shaft between said first and second gears thereon for selectively clutching to said output shaft either of said first and second gears thereon, and a sleeve slidably but non-rotatably mounted on said other countershaft between said second and third gears thereon for selectively clutching to said other countershaft either said second or third gear thereon.

11. A change speed transmission mechanism comprising axially alined power input and output shafts and two countershafts alongside thereof, a gear rigid with said input shaft, a gear journaled on said input shaft, first and second gears journaled on said output shaft, a first gear rigid with one of said countershafts and intermeshing continuously with the gear journaled on said input shaft, a second gear rigid with said countershaft and intermeshing continuously with said first gear on said output shaft, a third gear rigid with said countershaft and intermeshing continuously with said second gear on said output shaft, a first gear rigid with said other countershaft and intermeshing continuously with the gear rigid with said input shaft, a second gear journaled on said other countershaft and intermeshing continuously with said second gear on said output shaft, a third gear journaled on said other countershaft and intermeshing continuously with said second gear on said first mentioned countershaft, means for clutching to said input shaft either the gear journaled thereon or the first gear on said output shaft, means for clutching to said output shaft either of said first and second gears thereon, means for clutching to said other countershaft either the second or third gear thereon, a fourth gear rotatable with said first gear on said other countershaft, a power take-off shaft adjacent to said other countershaft, and a gear rigid with said countershaft and intermeshing continuously with said fourth gear.

GEORGE W. CURTIS.